W. S. SMITH.
SCALE.
APPLICATION FILED AUG. 28, 1916.
1,405,634.
Patented Feb. 7, 1922.
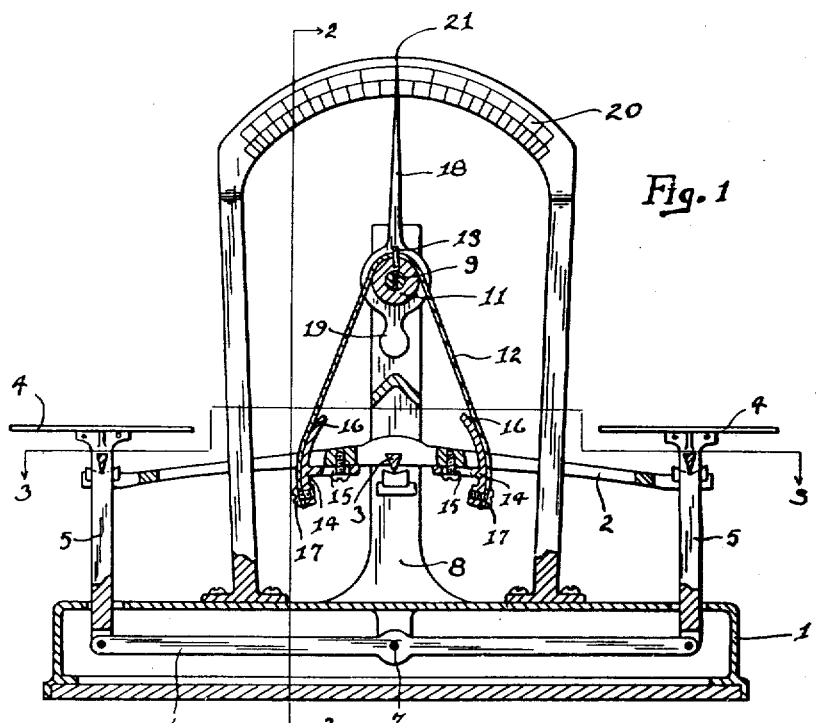
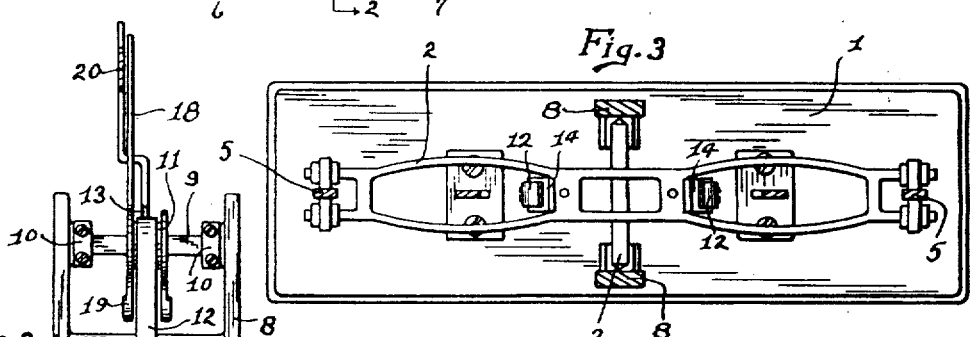
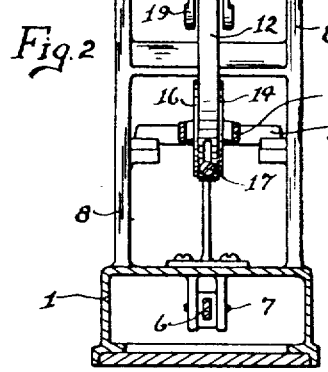
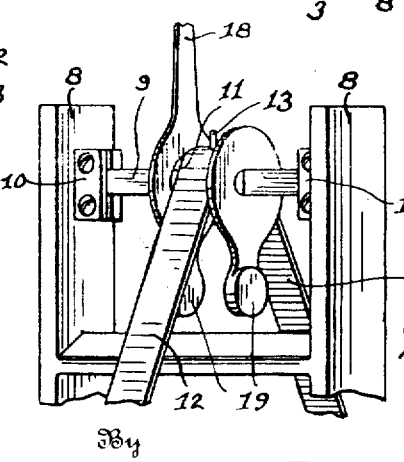
Inventor
Walter S. Smith
Witness
R. M. McCormick
A. L. Phelps
By
C. C. Shepherd
Attorney

UNITED STATES PATENT OFFICE.

WALTER S. SMITH, OF COLUMBUS, OHIO, ASSIGNOR TO THE SMITH SCALE COMPANY, OF COLUMBUS, OHIO, A CORPORATION OF OHIO.

SCALE.

1,405,634.  Specification of Letters Patent.  Patented Feb. 7, 1922.

Application filed August 28, 1916. Serial No. 117,129.

*To all whom it may concern:*

Be it known that I, WALTER S. SMITH, a citizen of the United States, residing at Columbus, in the county of Franklin and State of Ohio, have invented certain new and useful Improvements in Scales, of which the following is a specification.

This invention relates to scales and is particularly directed to what is known as torsion scales. The invention is itself particularly adaptable to scales of the under and over weight indicating type or wherein the beam movement is indicated by an indicator.

One of the objects of my invention is to provide a scale wherein the movement of the indicator is multiplied to a desired extent with respect to the movement of the scale beam. Another object of the invention is to reduce to a minimum friction between the connecting elements by which movement of the scale beam is transmitted to the indicator.

A further and equally important object of this invention resides in the provision of a scale wherein the level of the same in no way has an influence destroying the accuracy of its measurements or, in other words, the scale may be considerably out of plumb without destroying the accuracy of the weighing or indicating mechanism. This I have shown and described as resulting from the combination of a pivotally mounted evenly balanced beam and a torsion strip independent of the pivotal mounting of the beam, together with an operative connection between this beam and the torsion strip, of such nature that the torsion strip is distorted when the beam is moved. Because an evenly balanced beam is in equilibrium no matter what may be its angularity, this arrangement of beam and torsion strip creates the same vibratory influences as a pendulum beam or a beam which is pivoted above its center of gravity, with the added advantage that the resting level of the scale whether plumb or not, adds no exterior influence to the beam.

My invention also consists in the combination with a scale of a torsion strip and an indicating means acting in conjunction therewith, said indicating means being operated by the functioning of the scale to distort the torsion strip itself, rather than cause the indicating parts to operate by the functioning of the scale and these indicating parts or means then causing a distortion of the torsion strip. In other words, the scale parts as they move, operate upon the torsion strip to cause its distortion, which latter then operates the indicating means. This distinguishes from such mechanisms as cause the scale parts to move the indicator directly and permit the movement of the indicator to create a distortion of the torsion strip.

These and other objects of my invention I accomplish by means of the principles disclosed in the accompanying sheet of drawings, which represents one embodiment of my invention, in which similar characters of reference designate corresponding parts, and in which:

Figure 1 is a vertical section through the scale mechanism,

Figure 2 is a transverse vertical section taken on line 2—2 of Figure 1,

Figure 3 is a horizontal section taken on line 3—3 of Figure 1 and,

Figure 4 is a fragmentary view in perspective showing the torsion strip and its auxiliary mechanism.

In these several views, the base or supporting structure of the scale is designated in its entirety by the reference numeral 1 and there is pivotally supported on this base a beam 2 by means of the knife edge structure shown at 3. This beam is what is known as an even balance beam, but it will be apparent that a scale of the steel-yard or any other type, may be included and properly perform its functions in connection with the novel structure to be presently described. This beam, as is customary carries the two weight pans 4 on its opposite ends, these pans carrying the downwardly projecting stems 5 which are in turn pivoted to the brace rod 6, which is itself centrally pivoted as is shown at 7.

Mounted between a pair of upstanding supports 8 rising from the base 1 is a torsion strip 9 which is held securely clamped by means of the structure shown at 10. To this torsion strip, there is also rigidly secured a drum 11 over which a flexible band 12 passes. This band operatively engages the drum 11 and to avoid slippage, a pin 13 is driven into the same and through the band to form an anchor. The opposite ends of this flexible strip are both rigidly secured to the beam 2 at equal distances upon opposite sides of its fulcrum point 3. Thus, it will be apparent that, should the scale elements be moved out of their normal or neutral position, the torsion strip 9 will be placed under stress because of the rotary movement caused by the band 12 in its engagement with the drum 11. In order to maintain an operative length of this band 12 for all positions which the scale beam may assume, I have provided a pair of stirrups 14 designed to be adjustably secured to the beam structure by means of the pin and slot connections shown at 15. These stirrups are provided with working faces 16 which are arcuate, the curvature being about the fulcrum point 3 as a center. The two ends of the flexible strip or band 12 are secured to the lower ends of the stirrups by means of the screws as is shown at 17 and as the beam vibrates, these stirrups serve to maintain a uniform distance between the center about which the stirrups move and those points upon said stirrups from which the strip or band extends in a straight line to the drum 11.

The torsion strip 9 is further provided with an indicator arm structure 18, which indicator arm is preferably attached to the drum 11. The arrangement of the indicator arm is such that the weight above the center of rotation of the drum 11 is the same as that below this center, this being accomplished by means of the counterweight parts 19. This arrangement is resorted to to maintain the indicator arm in a state of equilibrium no matter what may be its position of angularity with respect to the chart arrangement shown at 20. In the present arrangement, this chart is graduated from the center designated 21 and consequently the indicator will have a longer range of movement per unit of weight as it approaches or leaves this center, than it will toward the outer ends. In this manner the amount of under or over weight may be readily determined and this accomplished where the scale indicator is most sensitive.

A further feature of advantage in the use of the drum and flexible strip member 12, is that the indicator arm movement is multiplied perceptibly when considered with relation to the beam movement, the ratio of multiplication being the relation between the diameter of the drum 11 and the distance the working faces 16 of the stirrups are from the fulcrum point 3. By this arrangement, the indicator arm 18 is caused to move in the same direction as the scale beam. In other words, should the scale beam tilt down on the right, the indicator arm 18 will also move to the right, which is the natural direction in which the eye would look for it to move.

From the foregoing description, it will be apparent that a vibratory beam is thus created by the combination of the even balance beam and the torsion strip, together with the operative connection 12 between them. The torsion strip, when under stress, serves after the manner of a pendulum, in that it normally tends to return the beam to its neutral position. However, the difference and also the advantage over a pendulum beam, is that the scale itself may be out of plumb without destroying its weighing efficiency. The beam 2 being evenly balanced on both sides of its fulcrum and the same being true of the indicator arm 18, these elements will be in equilibrium no matter what may be their positions of angularity. Their neutral positions, however, are determined by the neutral position of the torsion strip and this may be in any one of a number of planes.

What I claim, is:

1. The combination with the movable beam of a scale, of a torsion strip supported independently of the beam and a connecting element extending between the beam and the torsion strip, said torsion strip carrying a part with which said element has rolling engagement, said torsion strip tending to maintain said beam in neutral position.

2. In a scale, a supporting frame, a movable beam and means exerting an influence maintaining said beam when unweighted in a neutral position, said means functioning irrespective of the level of the supporting frame and said means including a torsion element and a flexible connecting element connected to said beam and having non-rubbing engagement with said torsion element.

3. The combination with the movable beam of a scale, of a suitably supported torsion strip, a drum carried by said strip, flexible connecting means operatively connected with said beam and said drum so that said strip is distorted by movement of said beam, and indicating means operated by the distortion of said strip.

4. A scale comprising a pivoted beam, a torsion strip independent of the pivotal mounting of said beam, an indicator arm carried by said strip, a drum carried by said strip, and a flexible connecting means attached to said beam and operatively engaging said drum to distort said strip when the beam is moved from neutral position.

5. A scale comprising a pivoted beam, a torsion strip above the beam fulcrum, an indicator arm operatively carried by said strip, a drum carried by said strip, and a flexible member operatively engaging said drum at approximately its center and attached at its two ends to said beam on opposite sides of its fulcrum.

6. A scale comprising a pivoted beam, a torsion strip independent of the pivotal mounting of said beam, an indicator arm carried by said strip, a drum carried by said strip, a flexible connecting means attached to said beam and operatively engaging said drum to distort said strip when the beam is moved from neutral position, and a stirrup structure having a circular working face with the beam fulcrum as the center by means of which said flexible member is attached to the beam.

7. A scale comprising a pivoted beam, a torsion strip above the beam fulcrum, an indicator arm operatively carried by said strip, a drum carried by said strip, and a flexible member operatively engaging said drum at its center and attached at its two ends to said beam on opposite sides of its fulcrum, the points of attachment and the size of said drum being in such relation that the beam movement is registered by a perceptibly multiplied movement of the indicator.

8. A scale comprising a base, a beam fulcrumed on said base, a yoke extending up from said base, a torsion strip spanned across said yoke, an indicator arm operatively attached to said strip, said arm being of equal weight above and below said strip, and a flexible connection between said beam and said indicator in a ratio to multiply the travel of said beam as recorded by said indicator.

9. The combination with the movable beam of a scale, of a torsion element supported independently of the beam, a flexible strip and elements carried by the beam and torsion element, respectively, and having arcuate faces with which said strip engages to distort the torsion strip when the beam is moved.

10. In a scale, the combination of a pivotally mounted even balance beam, a suitably supported torsion strip independent of the pivotal mounting of said beam, and a flexible strap connection between said beam and said strip so that the strip is distorted by movement of the beam.

11. In a scale, the combination of a pivotally mounted even balance beam, a suitably supported torsion strip independent of the pivotal mounting of said beam, a drum carried by said strip, an operative connection between said beam and said drum so that said strip is distorted by movement of said beam, and indicating means operated by the distortion of said strip.

12. In a scale, the combination of a pivotally mounted even balance beam, a torsion strip independent of the pivotal mounting of said beam and arranged in vertical alignment with the beam pivot, a drum carried by said strip, and a flexible strap operatively engaging said drum and attached to said beam at equal distances from its pivot.

13. In a scale, the combination of a pivotally mounted even balance beam, a torsion strip independent of the pivotal mounting of said beam, and arranged in vertical alignment with the beam pivot, a drum carried by said strip, a flexible strap operatively engaging said drum and attached to said beam at equal distances from its pivot, and an evenly balanced indicator arm operatively carried by said strip and moved by the distortion of said strip.

14. The combination with the movable beam of a scale, of a torsion element supported independently of the beam, a flexible strip and parts carried by the beam and torsion element, respectively, and having arcuate faces with which said strip engages to distort the torsion element when the beam is moved, the radius of the arcuate faces of the beam-carried part being greater than the radius of the arcuate face of the torsion element carried part to multiply the movement of the latter with respect to the former.

15. The combination with the movable beam of a scale, of a torsion strip supported independently of the beam, an indicator operated by the movement of the torsion strip and a connecting structure between the beam and the torsion strip including an actuating element and parts carried by the torsion strip and beam respectively with which said element has rolling engagement.

16. A structure as recited in claim 15 wherein the connection of the element with the beam is in such relation to the connection of the element with the strip as to multiply the movement of the beam in its effect upon the strip and indicator.

In testimony whereof I affix my signature in presence of two witnesses.

WALTER S. SMITH.

Witnesses:
Walter E. L. Bock,
A. L. Phelps.